3,842,100
BENZANTHRACENE DERIVATIVES
Arthur D. Sill, Cincinnati, Ohio, assignor to Richardson-Merrell Inc., New York, N.Y.
No Drawing. Filed Dec. 21, 1972, Ser. No. 317,145
Int. Cl. C07c 93/20
U.S. Cl. 260—364                        3 Claims

ABSTRACT OF THE DISCLOSURE

Novel 3,9-bis-basic esters of 7H-benz[de]anthracen-7-one, their preparation and use for the prevention and inhibition of viral infections are disclosed.

FIELD OF THE INVENTION

This invention relates to new organic chemical compounds, to their preparation, and to pharmaceutical compositions containing such compounds. The compounds described herein are antiviral agents which are useful in inactivating or inhibiting viruses by their administration to either an infected or a non-infected host.

BACKGROUND OF THE INVENTION

There is a growing body of information that viruses play a vital role in a broad range of diseases, some of which represent the most serious of man's ills. Arthritis, juvenile arthritis, diabetes, Hodgkin's disease and various immunological diseases and degenerative diseases of the central nervous system have been linked to viruses as the causative agents.

At present, the control of virus infections is primarily achieved by means of immunization vaccines. For example, poliomyelitis, smallpox, measles and influenza are well recognized diseases in which viral vaccines have proven effective. In general, however, viral vaccines have had only a moderate success in animal prophylaxis. Each vaccine acts primarily against a specific virus and is not heterophilic in the protection it offers. Hence, vaccines do not provide a practical solution against the wide array of infectious viruses, even when limited as for example, solely to respiratory viruses.

One approach to the control of virus-related diseases and, particularly to the spread of such virus diseases, has been to search for medicinal agents or chemotherapeutic agents which are capable of inhibiting the growth of viruses, thereby preventing the spread of disease as well as preventing further damage to cells and tissues of the animal host which have not as yet been infected. Heretofore, only a limited number of virus infections such as smallpox, Asian influenza and herpes keratitis have been susceptible to prevention by chemical antiviral agents. Sulfonamides and antibiotics which have revolutionized the treatment of bacterial infections have substantially no effect upon virus infections. Certain infections caused by large viruses, such as lympogranuloma venereum, psittacosis and trachoma have been successfully treated using antibiotics and sulfa drugs. However, the majority of infections have not been responsive to attack by chemotherapeutic agents. Thus, it can be seen that there is a need for new chemotherapeutic agents which are effective against a broad range of virus diseases, and which at the same time, are not non-toxic to the host.

As a result of a long series of investigations, applicants have discovered a novel class of 3,9-bis-basic esters of 7-H-benz[de]anthracen-7-one which are particularly useful antiviral agents. These compounds are effective against a wide spectrum of virus infections and are useful in treating such infections either prophylactically or therapeutically.

To applicant's knowledge, the benzanthracenes described and claimed herein are novel compounds which have not previously been described nor reported in the literature. U.S. Pats. 3,531,489 and 3,662,062 are believed to be the closest prior art, and relate to esters of fluoranthene and fluoren-9-one useful as antiviral agents. The bis-basic esters of the present invention, however, are derived from a totally different, 6,6,6,6 ring system which differs substantially from either the fluorene or fluoranthene nucleus. Additionally, applicants are unaware of any previously reported benzanthracene derivatives of any kind which are known to possess antiviral activity. The compounds of the present invention possess a wide spectrum of antiviral activity in varying degrees which could not have been predicted from a knowledge of the present state of the art.

SUMMARY OF THE INVENTION

This invention relates to new derivatives of 7H-benz[de]anthracen-7-one, to their methods of preparation and to their usefulness as pharmaceutical agents. More particularly, the compounds of the present invention relate to 3,9-bis-basic esters of 7H-benz[de]anthracen-7-one, which are useful as antiviral agents. Still more particularly, the compounds of the present invention may be represented by the following general formula:

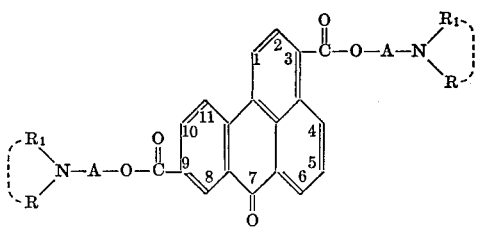

wherein A is a straight or branched alkylene chain having from 2 to 6 carbon atoms; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, piperidino or morpholino radicals.

The compounds within the scope of the present invention include both the free base form as well as the pharmaceutically acceptable acid addition salts thereof. In general, the salts of these compounds are crystalline materials which are soluble in water and various hydrophilic organic solvents, and which, in comparison to their free base forms, demonstrate higher melting points and exhibit an increased stability.

The tertiary amino 3,9-bis-basic esters of 7H-benz[de]-anthracen-7-one can be prepared by reacting 7-oxo-7H-benz[de]anthracene-3,9-dicarboxylic acid or a reactive salt thereof with a tetiary aminoalkyl halide, either with or without the presence of a catalyst, as illustrated in the following reaction scheme:

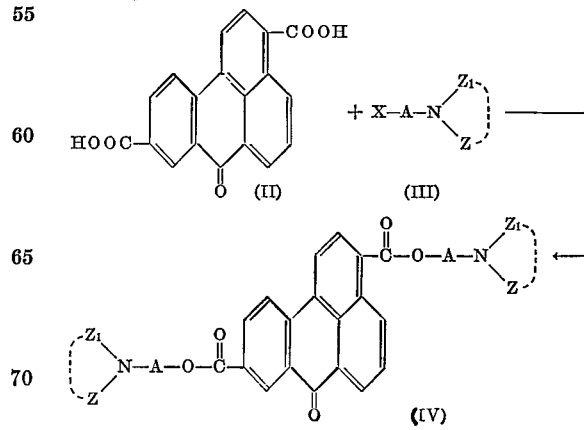

In the above reaction scheme, the symbol X represents chlorine or bromine and the symbol A has the value previously assigned to it. The symbols Z and $Z_1$ have the same meaning as the symbols R and $R_1$ of formula (I) previously described with the exception that neither Z nor $Z_1$ are hydrogen.

Alternatively, the compounds of this invention can be prepared by reacting 7-oxo-7H-benz[de]anthracene-3,9-dicarboxylic acid, or a reactive derivative thereof, with an aminoalkanol, either with or without the presence of condensing agent as illustrated by the following reaction scheme:

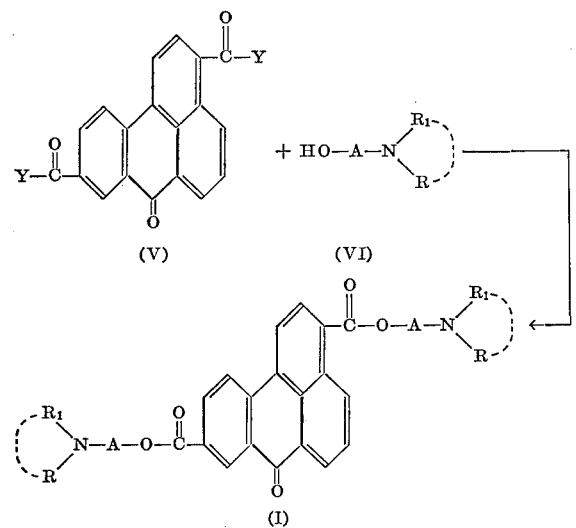

In the above sequence, the symbol Y is selected from the group consisting of chlorine, bromine and hydroxy, whereas the symbols A, R and $R_1$ have the meanings previously assigned to them. The primary and secondary 3,9-bis-basic esters of 7H-benz[de]anthracen-7-one may also be prepared using this method provided the primary and secondary aminoalkanols are suitably protected. Suitable blocking agents include salt formation, or more preferably, the reaction of the primary or secondary amine with a readily removable blocking group such as the carbobenzoxy group.

To achieve an antiviral effect the compounds of this invention are administered to a suitable host using a variety of compositions. Such compositions may be administered either prior to infection, as a prophylactic use or treatment, or they may be therapeutically administered subsequent to infection of the host as a curative use or treatment.

A wide variety of compositions are also included within the scope of the present invention. Thus, the instant compounds may be applied externally or topically directly to the situs of infection, or they may be administered internally or systemically, irrespective of whether the treatment is prophylactic or curative in nature. In either event, replication of the virus is inhibited or prevented with the concomitant result that the various disease symptoms characteristic of the pathogenic virus infection are no longer present.

DETAILED DESCRIPTION OF THE INVENTION

As can be seen from an examination of general formula (I) above, the compounds of the present invention include a bis-basic side chain in the 3 and 9 positions of the 7H-benz[de]anthracen-7-one nucleus. The basic side chain can be regarded as consisting of a bridging ester function which connects one end of an alkylene chain of determinate length with the 7H-benz[de]anthracene or aromatic nucleus. At the opposite or terminal end of the alkylene chain resides a basic primary, secondary or tertiary amino group. It is further apparent that both of the basic side chains are located in the A and D or benzenoid portions of the aromatic nucleus.

The alkylene chain which separates the amino function from the 7H-benz[de]anthracene nucleus represents either a straight or branched alkylene chain. Additionally, each of the alkylene chains may be the same or different; preferably, however, both groups are the same. The alkylene chain consists of from 2 to 6 carbon atoms and separates the adjacent oxygen atom of the ester group from the amino nitrogen atom by at least 2 carbon atoms, i.e., the oxygen and amino nitrogen cannot share the same atom of the alkylene group. Illustrative of the various alkylene groups which are represented by the symbol —A— are: ethylene, 1,3-propylene, 1,4-butylene, 1,5-pentylene, 1,6-hexylene, 2-methyl-1,4-butylene and 3-methyl-1,5-pentylene.

The basic amino function represented by the symbol

can be a primary secondary or a tertiary amino group. Preferably, each amino group is a tertiary amine. The symbols R and $R_1$ represent either hydrogen or a lower alkyl group. The term lower alkyl as used herein with regard to the basic amino function relates to groups having from 1 to 6 carbon atoms. Illustrative of such groups can be mentioned both straight or branched chain alkyl radicals such as: methyl, ethyl, n-propyl, isopropyl, n-butyl, sec-butyl, isoamyl, n-pentyl and n-hexyl. When R and $R_1$ each represent lower alkyl, a preferred subgenus is formed.

Eah R and $R_1$ can also represent a cycloalkyl group having from 3 to 6 carbon atoms. Illustrative of such groups are the cyclopropyl, cyclobutyl, cyclopentyl and cyclohexyl radicals.

The symbols R and $R_1$ also represent an alkenyl group having from 3 to 6 carbon atoms. In addition to the unsaturation which must be present, this unsaturation must be in a position other than the 1-position of the alkenyl group in order to prevent hydrolysis from occurring. Illustrative of such groups are the allyl, 3-butenyl and the 4-hexenyl radicals.

R and $R_1$ may also be joined with the nitrogen atom to which they are attached to represent various saturated monocyclic, heterocyclic radicals. Typical of such heterocyclic groups are the 1-pyrrolidinyl, piperidino or morpholino radicals. Compounds containing these groups are readily prepared and typify saturated monocyclic heterocyclic radicals which are generally useful in lieu of the di-lower alkylamino groups present in the compounds of this invention.

Illustrative of the base compounds of the present invention represented by general formula (I) there can be mentioned:

bis[3-(diethylamino)propyl]7-oxo-7H-benz[de]anthracene-3,9-dicarboxylate,
bis[3-(dibutylamino)propyl]7-oxo-7H-benz[de]anthracene-3,9-dicarboxylate,
bis[4-(piperidino)butyl]7-oxo-7H-benz[de]anthracene-3,9-dicarboxylate,
bis[2-(N-cyclohexyl-N-methylamino)ethyl]7-oxo-7H-benz[de]anthracene-3,9-dicarboxylate,
bis(5-amino-2,2-dimethylpentyl)7-oxo-7H-benz[de]anthracene-3,9-dicarbozylate, and
bis (4-diallylamino-2-methylbutyl)7-oxo-7H-benz[de]anthracene-3,9-dicarboxylate.

The expression "pharmaceutically acceptable acid addition salts" is intended to apply to any non-toxic organic or inorganic acid addition salts of the base compounds represented by formula (1). Illustrative inorganic acids which form suitable salts include hydrochloric, hydrobromic, sulphuric and phosphoric acid and acid metal salts such as sodium monohydrogen orthophosphate and potassium hydrogen sulfate. Illustrative organic acids which form suitable salts include the mono, di and tricarboxylic acids. Illustrative of such acids are, for example, acetic, glycolic, pyruvic, malonic, succinic, glutaric, fumaric, malic, tartaric, citric, ascorbic, maleic, hydroxymaleic, benzoic, hydroxybenzoic, phenylacetic, cinnamic, salicylic, 2-phenoxybenzoic and sulfonic acids such as methane sulfonic acid and 2-hydroxyethane sulfonic acid. Either the mono or the di-acid salts can be formed, and such salts can exist in either a hydrated or a substantially anhydrous form. In general, the acid addition salts of these compounds are crystalline materials which are soluble in water and various hydrophilic organic solvents and which in comparison to their free base forms, generally demonstrate higher melting points and an increased chemical stability.

The 3,9-bis-basic esters of 7H-benz[de]anthracen-7-one can be prepared using one of several esterification procedures. Thus, esterification can be achieved by reacting 7-oxo-7H-benz[de]anthracene-3,9-dicarboxylic acid (II) with a tertiary aminoalkyl halide (III). The 7-oxo-7H-benz[de]anthracene-3,9-dicarboxylic acid can be obtained by reacting commercially available 3,9-dibromo-7H-benz[de]anthracen-7-one with cuprous cyanide to form the corresponding dicarbonitrile. The dicarbonitrile is then hydrolyzed via conventional methods to form the 7-oxo-7H-benz[de]anthracene-3,9-dicarboxylic acid starting material (II). Esterification of the dicarboxylic acid is conducted by reacting with a tertiary aminoalkyl halide at temperatures ranging from room temperature to the reflux temperature of the reaction mixture for periods ranging from one hour to about 5 days. The reaction may also be conducted with or without the presence of a condensing agent or catalyst. Typical solvents for the esterification reaction include the lower alkanols with the reaction preferably conducted at the reflux temperatures of isopropyl alcohol in the presence of a catalytic amount of benzyltrimethylammonium chloride for a period ranging from about 6 to about 18 hours.

Alternatively, esterification can be achieved by reacting 7-oxo-7H-benz[de]anthracene-3,9-dicarboxylic acid or its corresponding dicarbonyl halide (V) with an aminoalkanol or an acid addition salt of an aminoalkanol (VI). The reaction is conducted using two or more moles of the aminoalkanol or salt thereof for each mole of dicarboxylic acid or dicarbonyl halide utilized. A wide range of solvents can be employed, such as chloroform, benzene, tetrahydrofuran or toluene, care being taken to remove any water or alcohols which they may contain. The reaction can be conducted over a wide range of temperatures and reaction times. Generally, a temperature ranging from about 20° C. to the reflux temperature of the particular solvent selected is employed with the reaction being conducted for a period ranging from about 1 to about 24 hours. Preferably, the reaction is conducted in a chloroform solution using a 7-oxo-7H-benz[de]anthracene-3,9-dicarbonyl chloride or bromide with an aminoalkanol at its reflux temperature for a period of from about 1 to about 4 hours.

In those instances in which the basic amino group is a primary or secondary amine, i.e., R and/or $R_1$ is hydrogen, the amine should first be protected with a suitable blocking group in order to avoid a rearrangement to the corresponding amide. Suitable blocking groups include the use of the carbobenzoxy and p-toluenesulfonyl group which are readily removed subsequent to esterification by means of either hydrobromic acid or phenol. Additionally, the formation of acid addition salts with the primary or secondary amines can be successfully employed.

The compounds of the present invention are antiviral agents. Preferably they are administered to an animal host to prevent or inhibit viral infections. The term host refers to any viable biological material or intact animal including humans which is capable of inducing the formation of interferon and which serves as a support means for virus replication. The host can be of animal or mammalian origin. Illustratively such hosts include birds, mice, rats, guinea pigs, gerbils, ferrets, dogs, cats, cows, horses and humans. Other viable biological material such as used in the production of vaccines may also act as a host. Thus, tissue cultures prepared from organ tissues, such as mammalian kidney or lung tissue, as well as tissue cultures prepared from embryo tissue, such as obtained from amniotic cells or chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus; myxoviruses, such as influenza $A_2$ (Jap/305) virus; arboviruses; such as Semliki forest virus; the herpes group of viruses, including herpes simplex; and the poxviruses, as for example, vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ anywhere from 5 to 50, delay or prevent completely the onset of death. Salts of these compounds are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used for each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated by a side by side comparison of the survival time of treated animals with the untreated control group of animals.

Respiratory viruses, such as influenza $A_2$ (Jap/305) virus, which are also lethal to the test animals employed, are administered via intranasal instillation. Animals infected in this manner have the active ingredients administered in the same manner as the test virus, and again a side by side comparison is made of the survivors of the animals treated with the untreated control animals.

Inexplicably, a mouse fatally infected with encephalomyocarditis or influenza virus occasionally survives without further treatment. This may be the result of a prior, interferon-induced infection in the mouse, or perhaps due to some genetic factor or other natural defense mechanism not presently understood. For this reason the control group selected is of sufficient size as to statistically reduce to a negligible amount the influence of such a chance survivor upon the test results.

The vaccinia test virus is typical of the dermatotropic type viruses which respond to treatment with compositions containing the compounds of the instant invention. The vaccinia virus generally produces a nonfatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals which serve as a control group. The compounds of the present invention have been found to be effective in varying degrees against one or all of these test virus systems.

The mode of activity of the active ingredients of the present invention is not rigorously defined. *Inter alia,* the compounds of the present invention may induce the formation of interferon in a viable host. Interferon is a biological substance of unknown chemical structure, presumably proteinaceous in nature, which is produced by host cells in response to a viral infection. The interferon so produced acts to induce a virus inhibiting substance, which inhibits in some yet unknown manner the intracellular replication of the virus without appearing to have any inactivation effect *per se* upon the virus itself. A few of the viruses susceptible to interferon replication inhibition are described in Horsfall and Tamm, "Viral and Rickettsial Infections of Man," 4th Edition (1965), J. B. Lippincott Company, pp. 328–9.

As previously indicated, the compounds of the present invention may be prophylactically administered in order to prevent the spread of contagious viral diseases or they may be therapeutically administered to a host already infected intended for their curative effect. When administered prophylactically, it is preferred that the administration be made within 0 to 96 hours prior to the infection of the host animal with a pathogenic virus. When the compounds of the present invention are administered for their curative effect, it is preferred that they are administered within about 1 or 2 days following infection of the host in order to obtain the maximum therapeutic effect.

The dosage to be administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg. to about 500 mg. per kg. of body weight. Illustratively dosage levels of the administered active ingredients for intravenous treatment range from about 0.1 mg. to about 10 mg. per kg. of body weight; for intraperitoneal administration range from about 0.1 mg. to about 50 mg. per kg. of body weight; for subcutaneous administration range from about 0.1 mg. to about 250 mg. per kg. of body weight; for oral administration may be from about 0.1 mg. to about 500 mg. per kg. of body weight; for intranasal instillation range from about 0.1 mg. to about 10 mg. per kg. of body weight; and for aerosol inhalation therapy, the range is generally from about 0.1 mg. to about 10 mg. per kg. of body weight.

The novel compounds described herein can also be administered in various different dosage unit forms, e.g., oral compositions such as tablets, capsules, dragées, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylactic or therapeutic in nature. Thus, a particular dosage unit may contain from about 2.0 mg. to over 3.0 g. of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and the polyethylene alcohols either with or without the addition of a surfactant. In general, the preferred liquid excipients particularly for injectable preparations, include water, saline solution, dextrose and glycol solutions such as an aqueous propylene glycol or an aqueous solution of polyethylene glycol. Liquid preparations to be used as sterile injectable solutions will ordinarily contain from about 0.5% to about 25% by weight, and preferably from about 1% to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A suitable method of administration for the compounds of the present invention is orally either in a solid dose form such as a tablet or capsule, or in a liquid dose form such as an elixir, suspension, emulsion or syrup. Ordinarily the active ingredient comprises from about 0.5% to about 10% by weight of an oral liquid composition. In such compositions, the pharmaceutical carrier is generally aqueous in nature, as for example, aromatic water, a sugar-based syrup or a pharmaceutical mucilage. For insoluble compounds suspending agents may be added as well as agents to control viscosity, as for example, magnesium aluminum silicate or carboxymethylcellulose. Buffers, preservatives, emulsifying agents and other excipients can also be added.

For parenteral administration such as intramuscular intravenous or subcutaneous administration, the proportion of active ingredient ranges from about 0.05% to about 20% by weight, and preferably from about 0.1% to about 10% by weight of the liquid composition. In order to minimize or eliminate irritation at the site of injection, such compositions may contain a non-ionic surfactant having a hyrrophile-lipophile balance (HLB) of from about 12 to about 17. The quantity of surfactant in such formulations ranges from about 5% to about 15% by weight. The surfactant can be a single component having the above identified HLB, or a mixture of two or more components having the desired HLB. Illustrative of surfactants useful in parenteral formulations are the class of polyoxyethylene sorbitan fatty acid esters as, for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components comprising excipients previously mentioned.

The active ingredients of the present invention can also be admixed directly with animal feeds or incorporated into the drinking water of animals. For most purposes, an amount of active ingredient is used which provides from about 0.0001% to about 0.1% and preferably, from about 0.001% to about 0.02% by weight of the active ingredient based upon the total weight of feed intake. The active ingredients can be admixed in animal feed concentrates, suitable for use by farmers or livestock growers for incorporation in appropriate amounts with the final animal feeds. These concentrates ordinarily comprise from about 0.5% to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatibility with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples:

EXAMPLE I

7-Oxo-7H-benz[de]anthracene-3,9-dicarbonitrile

A mixture of 25 g. (0.064 mole) of 3,9-dibromo-7H-benz[de]anthracen-7-one, 14.3 g. (0.16 mole) of cuprous cyanide and 70 ml. of benzyl cyanide is stirred at reflux temperature for 15 minutes and cooled to approximately 100° C. The reaction mixture is filtered and the residue washed with 40 ml. of benzyl cyanide followed by an acetone wash to give the desired 7-oxo - 7H - benz[de] anthracene-3,9-dicarbonitrile having an m.p. greater than 300° C.

EXAMPLE II

7-Oxo-7H-benz[de]anthracene-3,9-dicarboxylic acid

A mixture of 23.0 g. (0.082 mole) of 7-oxo-7H-benz[de]anthracene-3,9-dicarbonitrile, prepared in accordance with the preceding example, 15 ml. of water and 45 ml. of concentrated sulfuric acid is stirred and heated to 212° C. Considerable foaming occurs whereupon the heating is discontinued. The mixture is cooled, 250 ml. of deionized water added and the reaction product removed by filtration. The filtered product is washed with water and dissolved in 250 ml. of water containing 33 ml. of 20% sodium hydroxide. The resulting solution is filtered and the filtrate acidified to Congo Red with hydrochloric acid. The 7-oxo-7H-benz[de]anthracene-3,9-dicarboxylic acid which precipitates is removed by filtration and dried.

EXAMPLE III

Bis[3 - (dibutylamino)propyl]7 - oxo - 7H - benz[de] anthracene - 3,9 - dicarboxylate dihydrochloride hydrate A mixture of 6.0 (0.019 mole) of 7-oxo-7H-benz[de]anthracene-3,9-dicarboxylic acid, prepared in accordance with the preceding example, 9.2 g. (0.045 mole) of (3-chloropropyl)dibutylamine, 200 ml. of isopropyl alcohol and 0.2 ml. of a 60% aqueous solution of benzyltrimethylammonium chloride is stirred and heated to its reflux temperature for a period of 24 hours. The reaction mixture is treated with charcoal while still hot and filtered through a bed of diatomaceous earth. Dry ether is added to the filtrate to the point of incipient cloudiness and the mixture allowed to slowly cool. The resulting olive-drab precipitate is filtered, washed with additional dry ether, crystallized once from isopropyl alcohol and recrystallized three additional times from acetonitrile to give the product, bis[3 - (dibutylamino)propyl]7-oxo - 7H - benz[de] anthracene-3,9-dicarboxylate, as a hydrated dihydrochloride salt having a m.p. of 196.5° C.

$\lambda_{max.}^{0.1N\ HCl}$ 244, and $E_{1\ cm.}^{1\%}$ 409.

Following essentially the same procedure, but replacing the N-(3-chloropropyl)dibutylamine above with an equimolar amount of N-(3-chloropropyl)piperidine, N-(3-chloropropyl)diallylamine, N - (3 - chloropropyl) - N-methylcyclohexylamine or 3-chloro - N,N - diethyl-2,2-dimethylpropylamine results in the formation of the following bis-basic esters of 7H-benz[de]anthracen-7-one, respectively:

bis(3-piperidinopropyl)-7-oxo-7H-benz[de]anthracene-3,9-dicarboxylate dihydrochloride,
bis[3-(diallylamino)propyl]7-oxo-7H-benz[de] anthracene-3,9-dicarboxylate dihydrochloride,
bis[3-(N-cyclohexyl-N-methylamino)propyl]-7-oxo-7H-benz[de]anthracene,3,9-dicarboxylate dihydrochloride or
bis[3-(diethylamino)-2,2-dimethylpropyl]-7-oxo-7H-benz[de]anthracene-3,9-dicarboxylate dihydrochloride.

EXAMPLE IV

Bis(2-piperidinoethyl)-7-oxo-7H-benz[de]anthracene-3,9-dicarboxylate dihydrochloride To a sample of 7-oxo-7H-benz[de]anthracene-3,9-dicarboxylic acid is added an excess of thionyl chloride and a trace of pyridine. The mixture is heated at its reflux temperature for a period of two hours. The volatile materials are removed *in vacuo* leaving the bis acid chloride as a residue. A mixture of 27 g. (0.05 mole) of the bis-acid chloride is dissolved with stirring in 1 liter of chloroform (hydrocarbon-stabilized, stored over molecular sieves), treated with 12.9 (0.1 mole) of 2-piperidinoethanol and the mixture refluxed for a period of 4 hours. The reaction mixture is cooled, treated with a saturated sodium bicarbonate solution and the layers separated. The organic layer is washed with a saturated sodium bicarbonate solution, washed with water and washed with a saturated sodium chloride solution. The resulting chloroform solution is dried over anhydrous magnesium sulfate, acidified to Congo Red using ethereal hydrogen chloride and evaporated to dryness *in vacuo*. The resulting residue is recrystallized several times from a methanol-ether mixture to give the desired bis(2-piperidinoethyl)-7-oxo-7H-benz[de]anthracene-3,9-dicarboxylate as the dihydrochloride salt.

EXAMPLE V

Bis(5-amino-2,2-dimethylpentyl)-7-oxo-7H-benz[de] anthracene-3,9-dicarboxylate dihydrochloride A mixture of 16.8 g. (0.1 mole) of 5-amino-2,2-dimethyl-1-pentanol hydrochloride and 27 g. (0.05 mole) of 7-oxo-7H-benz[de]anthracene - 3,9 - dicarbonyl chloride in 600 ml. of chloroform (hydrocarbon stabilized, stored over molecular sieves) is stirred and refluxed for 24 hours. The reaction mixture is freed of most of the volatiles *in vacuo*, and the remaining residue purified by recrystallization from a methanol-ether mixture to yield the desired bis(5-amino-2,2-dimethylpentyl) - 7 - oxo - 7H - benz[de] anthracene-3,9-dicarboxylate as the dihydrochloride salt.

EXAMPLE VI

The following Example is illustrative of the anti-viral activity for the compounds of the present invention.

Thirty mice each weighing approximately 10 to 15 gms. are divided into two groups, a control group containing 20 animals and a test group of 10 animals. All of the animals are challenged with a fatal dose ($8LD_{50}$) of encephalomyocarditis virus. The test group of animals are treated both prophylactically and therapeutically using a parenteral composition containing bis[3-(dibutylamino) propyl]7-oxo-7H-benz[de]anthracene - 3,9 - dicarboxylate dihydrochloride hydrate as the active ingredient dissolved in an aqueous solution of 0.15% hydroxyethylcellulose. The composition contains the active ingredient in an amount such that each dosage contains 0.25 ml. which is equivalent to a dose level of 50 mg. per kg. The control group receives a subcutaneous placebo containing the same volume of vehicle without, of course, the active ingredient. Observations over a ten day period show a termination of all the control animals within a period of from 4 to 5 days, with the treated group of animals surviving for a statistically longer period of time.

EXAMPLE VII

Preparation of a capsule formulation

An illustrative composition for hard gelatin capsules is as follows:

| | Mg. Per Capsule |
|---|---|
| (a) Bis[2-(diethylamino)ethyl] 7-oxo-7H-benz[de]anthracene-3,9-dicaboxylate dihydrochloride | 200 |
| (b) Talc | 35 |

The formulation is prepared by passing the dry powders of both (a) and (b) through a fine mesh screen and mixing them well. The powder is then filled into No. O hard gelatin capsules at a net fill of 235 mg. per capsule.

In a similar fashion, a soft gelatin capsule is prepared in which the talc is omitted. The dry bis[2-(diethylamino)ethyl]-7-oxo-7H - benz[de]anthracene - 3,9 - dicarboxlate dihydrochloride powder can be filled as a granulation, slug or compressed tablet directly into the rotary dye or plate mold in which the soft gelatin capsule is formed.

EXAMPLE VIII

Preparation of the tablet formulation

An illustrative composition for tablets is as follows:

| | Mg. Per Tablet |
|---|---|
| (a) Bis[2-(dimethylamino)ethyl]7-oxo-7H-benz[de]anthracene-3,9-dicarboxylate dihydrochloride | 100 |
| (b) Wheat starch and granulated starch paste | 15 |
| (c) Lactose | 33.5 |
| (d) Magnesium stearate | 1.5 |

The granulation obtained upon mixing lactose starch and granulated starch paste is dried, screened and mixed with the active ingredient and magnesium stearate. The mixture is compressed into tablets weighing 150 milligrams each.

EXAMPLE IX

Preparation of an oral syrup formulation

A 2% weight per volume syrup of bis[3-(dimethylamino)propyl]-7-oxo-7H-benz[de]anthracene - 3,9 - dicarboxylate dihydrochloride is prepared by the usual pharmaceutical techniques in accordance with the following formula:

| | Grams |
|---|---|
| (a) Finely divided bis[3-(dimethylamino) propyl]-7-oxo-7H-benz[de]anthracene-3,9-dicarboxylate dihydrochloride | 2.0 |
| (b) Sucrose | 33.3 |
| (c) Chloroform | 0.25 |
| (d) Sodiumbenzoate | 0.4 |
| (e) Methyl p-hydroxybenzoate | 0.02 |
| (f) Vanillin | 0.04 |
| (g) Glycerol | 1.5 |
| (h) Purified Water to 100.0 ml. | |

EXAMPLE X

Preparation of parenteral formulation

An illustrative composition for a parenteral injection is the following emuslion:

| Each ml. contains | Ingredients | Amount |
|---|---|---|
| 50 mg | Bis[3-(dibutylamino)propyl]-7-oxo-7H-benz[de]anthracene-3,9-dicarboxylate dihydrochloride. | 1.000 g. |
| 100 mg | Polyoxyethylene sorbitan monooleate | 2.000 g. |
| 0.0064 | Sodium chloride | 0.028 g. |
| | Water for injection, q.s. | 20.000 ml. |

The parenteral composition is prepared by dissolving 0.64 g. of sodium chloride in 100 ml. of water for injection, mixing the polyoxyethylene sorbitan monooleate with the bis[3-dibutylamino)propyl]-7-oxo-7H-benz[de]-anthracene-3,9-dicarboxylate dihydrochloride, adding a sufficient solution of the sodium chloride in water to the active ingredient and polyoxyethylene soribitan monooleate to make 20 ml., shaking the mixture, and then autoclaving the mixture for 20 minutes at 110° C., at 15 p.s.i.g. steam pressure. The composition can be dispensed in a single ampule for multiple dosage or in 10 or 20 ampules for single dosages.

EXAMPLE XI

Preparation of dusting powder formulation

The following formulation illustrates a dusting powder for topical use:

| | Gm. Per Kilogram |
|---|---|
| (a) Bis[3-(diethylamino)propyl]7-oxo-7H-benz[de]anthracene-3,9-dicarboxylate dihydrochloride | 20 |
| (b) Silica aerogel | 980 |

The dusting powder is prepared by intimately blending the ingredients. The resulting mixture is then packaged in suitable dispensing containers.

I claim:

1. A bis-basic ester of 7H-benz[de]anthracen-7-one having the general formula:

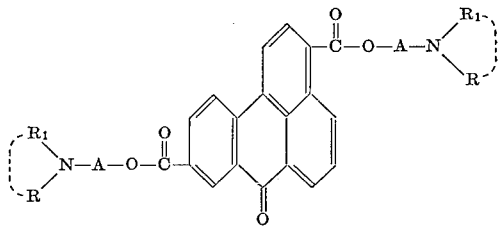

wherein A is a straight or branched alkylene chain having from 2 to 6 carbon atoms; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, piperidino or morpholino radicals; and the pharmaceutically acceptable acid addition salts thereof.

2. A compound of claim 1 wherein each R and $R_1$ are lower alkyl having from 1 to 6 carbon atoms.

3. A compound according to claim 1 having the formula:

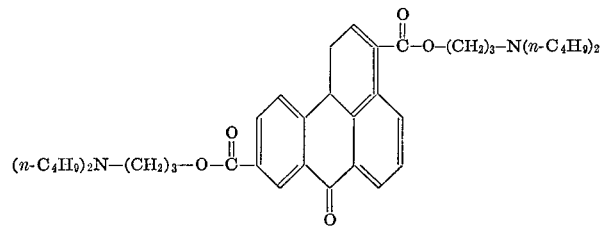

References Cited
UNITED STATES PATENTS 3,647,860   3/1972   Sill et al. _____ 260—475 FR LORRAINE A. WEINBERGER, Primary Examiner E. J. SKELLY. Assistant Examiner U.S. Cl. X.R.

260—246 B, 272, 326.25; 424—248, 267, 274, —308